US012583197B2

(12) United States Patent
Gnuechtel

(10) Patent No.: US 12,583,197 B2
(45) Date of Patent: Mar. 24, 2026

(54) IN-FACILITY WASTE HANDLING METHOD

(71) Applicant: CTPS LLC, Madison, WI (US)

(72) Inventor: Ingo Gnuechtel, Morrison, CO (US)

(73) Assignee: CTPS LLC, Madison, WI (US)

( * ) Notice: Subject to any disclaimer, the term of this patent is extended or adjusted under 35 U.S.C. 154(b) by 363 days.

(21) Appl. No.: 17/939,811

(22) Filed: Sep. 7, 2022

(65) Prior Publication Data

US 2023/0070648 A1     Mar. 9, 2023

Related U.S. Application Data

(60) Provisional application No. 63/242,485, filed on Sep. 9, 2021.

(51) Int. Cl.
| | |
|---|---|
| B30B 9/30 | (2006.01) |
| B30B 9/32 | (2006.01) |
| B65G 11/02 | (2006.01) |
| B65G 59/02 | (2006.01) |

(52) U.S. Cl.
CPC ............... B30B 9/301 (2013.01); B30B 9/32 (2013.01); B65G 11/023 (2013.01); B65G 59/02 (2013.01)

(58) Field of Classification Search
CPC ......... B30B 9/30; B30B 9/301; B30B 9/3014; B30B 9/32; B65G 59/02; B65G 59/026; B65G 11/023; B65G 47/80; B65G 47/82
See application file for complete search history.

(56) References Cited

U.S. PATENT DOCUMENTS

| | | | | |
|---|---|---|---|---|
| 4,358,236 A | * | 11/1982 | Dudley | B65G 59/045 |
| | | | | 198/690.1 |
| 4,601,238 A | * | 7/1986 | Davis, Jr. | B30B 9/30 |
| | | | | 100/249 |
| 4,787,308 A | * | 11/1988 | Newsom | B30B 9/3078 |
| | | | | 100/232 |
| 5,090,308 A | * | 2/1992 | Wang | B30B 9/321 |
| | | | | 100/902 |
| 5,267,590 A | * | 12/1993 | Pringle | B65G 15/28 |
| | | | | 414/791.7 |
| 5,310,307 A | * | 5/1994 | VanderMeer | B65G 59/026 |
| | | | | 414/796.8 |
| 7,421,946 B1 | * | 9/2008 | Pontus | B30B 9/3078 |
| | | | | 100/906 |

(Continued)

FOREIGN PATENT DOCUMENTS

| | | | | | |
|---|---|---|---|---|---|
| CN | 112919143 A | * | 6/2021 | ............. | B65G 15/30 |
| HU | 183703 B | * | 5/1984 | ............. | B65G 47/91 |

OTHER PUBLICATIONS

English translation of HU-183703-B, 6 pages (Year: 2024).*

(Continued)

*Primary Examiner* — Jimmy T Nguyen
(74) *Attorney, Agent, or Firm* — Stiennon & Stiennon

(57) ABSTRACT

A recycling apparatus for positioning within a canning facility receives pallets of damaged or otherwise unusable unfilled aluminum cans, and discharges the layers of cans within a depalletizer into a discharge chute which communicates with the hopper of a baler which compresses the cans and forms a compact bale which is then shipped to a recycled metal processor. The apparatus may be operated as a service to the canner charged on a per pound recovered basis.

10 Claims, 2 Drawing Sheets

(56)      References Cited

U.S. PATENT DOCUMENTS

2010/0242746 A1 *   9/2010   Taylor ................... B30B 9/3096
                                                                100/295
2021/0070559 A1 *   3/2021   Lowrey ................. B65G 47/80
2021/0188571 A1 *   6/2021   Yohe ..................... B65G 59/02

OTHER PUBLICATIONS

"Depalletizer-500," CODI Craft Canning System, https://www.codimfg.com/canning-line-infeed/depalletizer-500, downloaded Sep. 7, 2022. Available at least as early as Sep. 9, 2021.
"Auto Depal V3," Cask Global Canning Solutions, https://www.cask.com/canning-system-accessories/automated-depal/auto-depal-v3-image-card/ , downloaded Sep. 7, 2022. Available at least as early as Sep. 9, 2021.
"TSI TC-710 Recycling Baler," Mile-X Equipment, Inc., https://www.mile-x.com/tsi-tc-710-recycling-baler/, downloaded Sep. 7, 2022.
"Beverage Can Compactor and Usage in Recycling," Ningbo Sinobaler Machinery Company limited, https://www.sinobaler.com/beverage-can-compactor/ downloaded Sep. 7, 2022.

* cited by examiner

IN-FACILITY WASTE HANDLING METHOD

CROSS REFERENCES TO RELATED APPLICATIONS

This application claims the benefit of priority of U.S. Patent App. No. 63/242,485, filed Sep. 9, 2021, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to the manufacturing and handling of aluminum beverage cans. Each year about 180 billion aluminum cans are manufactured. About 100 billion of these aluminum cans are manufactured in the United States. During manufacture a certain percentage of aluminum cans are scrapped before they are used, i.e., before they are filled with a beverage. Aluminum cans may be scrapped before use for various reasons, such as the cans may have manufacturing defects, cans may be obsolete due to changes in can graphics or labeling, overproduced cans which will not be used in a timely fashion, or because of a lack of demand for a particular can size or shape. Unfilled aluminum cans are stored and transported on pallets. For example, a pallet may support 7,002 aluminum 12 oz cans stacked 18 layers high with plastic sheets between the layers. The weight of the aluminum cans in such a stacked pallet would be approximately 225 lbs. for a pallet of a size which covers 17 square feet of floor space. A typical semi-trailer has 408 square feet of bed area so when transporting cans for recycling a semi-trailer would be hauling only about 5,000 lbs. with a scrap value of $1,500 to $2,000, depending on the current price of aluminum scrap. What is needed is a more cost effective way of handling cans to be recycled at a can manufacturing facility.

SUMMARY OF THE INVENTION

The invention involves combining a depalletizer with a recycling baler such that the cans flow directly from the depalletizer to the baler. This combination of the depalletizer and a recycling baler works to greatly compact the volume of the cans to be recycled, thereby greatly reducing the cost of transportation of the aluminum material to be recycled. Metal recyclers do not have equipment for removing cans from the pellets and so do not have the ability to separate and preserve the plastic sheets which are placed between the layers of cans on the pallets. A depalletizer is able to not only unload the cans but is able to efficiently remove the sheets for reuse. The plastic sheets which separate the layers of cans on a pallet have a significant cost and typically are damaged or rendered useless when the recycler simply dumps the cans and plastic sheets to unload the pallets carrying the cans to be recycled.

In canning facilities depalletizers are employed for removing aluminum cans from the pallets on which they are supplied and introducing the cans into the canning production line without damage. The depalletizer in the process of unloading the aluminum cans separates and stacks the plastic sheets used between the layers of palletized cans so they can be reused. A depalletizer would not be cost effective equipment for the recycler to own and would not address the cost of transporting low density cans from the canner's facility to the recycler.

It is an object of the present invention to provide a recycling apparatus within a canning facility which can convert pallet loads of aluminum cans into compressed bales of scrapped cans which can be cost-effectively transported to a recycler.

It is another object of the present invention to configuring a depalletizer to rapidly unload cans from a pallet by moving a row of palletized aluminum cans into a discharge chute which feeds a hopper of a baler. The baler is operable to crush the aluminum cans and thus compress the cans to form a dense bale of crushed aluminum cans.

A further object of the invention is to unload pallets of unused and unfilled aluminum cans into a recycling baler and within the baler compact the cans so they can be cost-effectively shipped to an aluminum recycler.

A yet further object of the invention is to preserve the pallet and the separated plastic sheets so the plastic sheets, which separate layers of unfilled aluminum cans, can be reused.

Further objects, features and advantages of the invention will be apparent from the following detailed description when taken in conjunction with the accompanying drawings.

DESCRIPTION OF THE PREFERRED EMBODIMENTS

Figure 1:
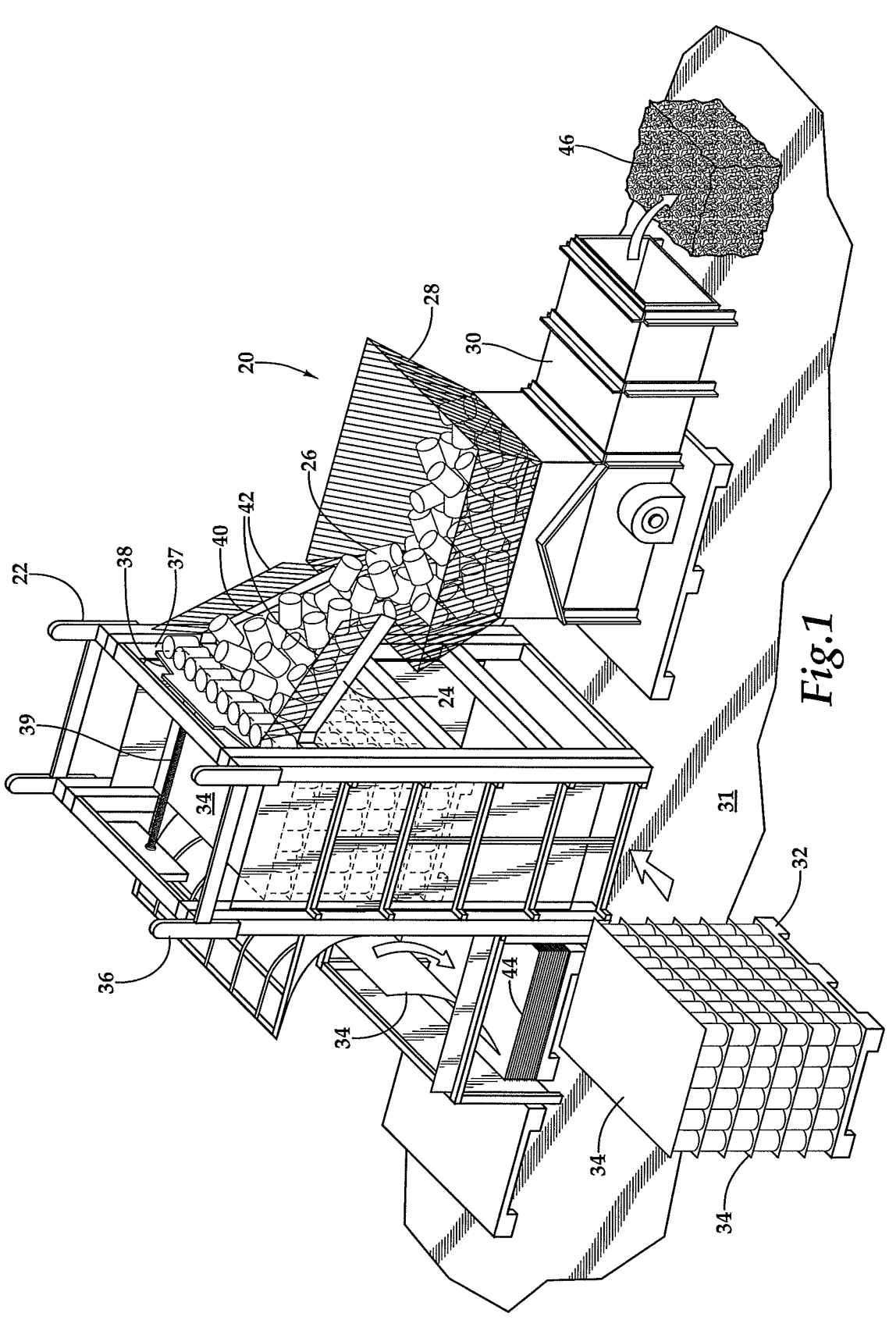
FIG. 1 is a front isometric view of a depalletizer arranged with a chute that directs the cans as they are depalletized into a recycling baler where the cans are compressed into a bale for transportation to be recycled.
Figure 2:
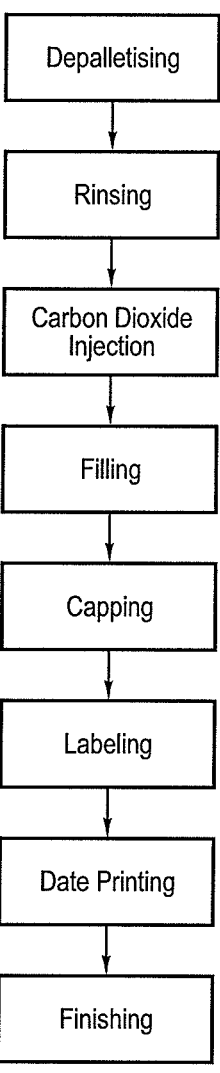
FIG. 2 is a schematic view of the prior art utilization of a depalletizer within a can filling facility, in which the depalletizer functions to unload open ended cans such that they can be fed undamaged in a processing line in a controlled manner.

Referring more particularly to FIGS. 1-2, wherein like numbers refer to similar parts, an aluminum can recycling apparatus 20 is shown in FIG. 1. The apparatus 20 has a depalletizer 22 with a discharge chute 24 by which depalletized cans 26 are communicated to a hopper 28 of a baler 30. The depalletizer 22 and baler 30 may be positioned in sequence and fixed to the factory floor 31.

In a prior art process when a depalletizer is used within a canning facility the depalletizing function is deployed as part of a canning line which processes aluminum cans without tops. The canning line starts with taking the cans from the pallets on which they are supplied and proceeds through the steps of rinsing the cans, filling the cans, closing the cans with tops (which are separately packaged and shipped to the canner), labeling the cans and performing other post-filling steps. In the prior art canning use of the depalletizer, the depalletizer's function is to unload aluminum cans without tops from a pallet which may have 18 or more layers of cans separated by plastic sheets. A pallet of aluminum cans may have 7,000 or more cans which are unloaded one layer of cans at a time by the depalletizer and fed into one or more can conveyors. The depalletizer must push a single layer of cans off the pallet in a controlled way so as not to overload the subsequent mechanism which feeds the can conveyors, and must do all this without causing any damage to the open palletized cans.

The depalletizer 22 as shown in FIG. 1 is part of the recycling apparatus 20 of this invention, the depalletizer is repurposed to feed the recycling baler 30. The depalletizer 22 may be based on depalletizers of a conventional type, such as the Automated Depalletizer V3 from Cask Global Canning Solutions of Calgary, Alberta, Canada; Can-I-Bus Depalletizer from Ska Fab of Durango, CO, and the Depalletizer-500 from CODI of Golden, CO.

In the apparatus 20, the depalletizer 22 operates on pallets 32 which are loaded with multiple layers of adjacent cans 26, separated by plastic sheets 34. Each pallet 32 is loaded into the frame 36 of the depalletizer 22. The depalletizer 22 has an internal mechanism which elevates the pallet to bring a layer of cans supported on a plastic sheet 34 to the discharge position where a discharge blade 38 is driven by an actuator 39 to advance the entire layer out of the depalletizer and into the chute 24. The chute 24 has a bottom wall 40 which is inclined downwardly and vertically extending side walls 42, the side walls converge along with the bottom wall as the chute 24 extends over a hopper 28 so the flow of cans is disordered as it emptied into the hopper, with the cans tipped off a can vertical axis. The chute bottom wall 40 and side walls 42 may be perforated or formed as grills of rods providing visibility into the chute. The hopper 28 is comprised of elements with gaps therebetween providing visibility into the hopper for observation of the cans being received therein. The inclination of the chute 24 allows the force of gravity to advance the cans into the hopper 28. Once a layer of cans 26 has been discharged, the blade 38 is reversed by the actuator 39 and is retracted to clear the pallet 32, and the underlying plastic sheet 34 is ejected from the side of the depalletizer opposite the discharge chute 24, and passed to a sheet stack 44 for collection and reuse. Once the uppermost sheet 34 has been cleared, the internal mechanism of the depalletizer elevates the pallet by the height of a single layer to bring the next lowermost layer into position for discharge by the blade 38. This process is repeated until all the cans 26 and sheets 34 have been removed from the pallet 32. The pallet is then unloaded from the depalletizer frame 36, and the next pallet load of cans 26 may be loaded.

The layer of aluminum cans 26 has a rectangular array having a length and a width. The depalletizer 22 has an opening 37 in the frame which is sufficiently wide to pass an entire row of cans which defines the width of the layer of cans. The depalletizer is thus configured to simultaneously feed all the cans in the row to the chute 24.

In the apparatus 20 the depalletizer 22 is configured to systematically feed cans without feedback to the chute 24, pouring the cans into the hopper 28 which holds one or more complete layers of cans from the pallet 32. As the cans are not constrained or ordered as would be necessary to feed into a can conveyor arrangement, there is no need for any feedback loop or sensors for monitoring can position or congestion. Moreover, there is no requirement that cans be handled gently to avoid damage. Within the baler 30 multiple layers of cans are compressed into a dense bale 46 which is passed out of the baler 22 ready for shipment to a recycled metal processor. One suitable baler 30 is model TSI TC-710 available from Mile-X Equipment Inc. of Coldwater Ohio. Another suitable baler is the SINOBALER® baler from Ningbo Sinobaler Machinery Company limited of Ningbo P.R. China.

Canning operations can regularly process and fill vast quantities of cans. With all the various jobs undertaken by the facility, damaged or otherwise unusable cans can constitute significant quantities of material to be disposed of in an efficient manner which recovers as much of the material as possible at an acceptable cost. Nevertheless, this process is secondary to the operation of the canning facility. The apparatus 20 of the invention may be operated by independent contractors to the canning facility, which can charge by the pound of material recovered. In this way the canning operator can readily project costs, effectively dispose of unneeded cans, and avoid management effort for what is an ancillary process. The contractor can handle service and operation of the apparatus. Because the apparatus works on one pallet at a time, if the apparatus must be taken out of service for repairs or maintenance, several pallets may accumulate until service is restored.

It is understood that the invention is not limited to the particular construction and arrangement of parts herein illustrated and described, but embraces all such modified forms thereof as come within the scope of the following claims.

I claim:

1. A method of disposing of palletized aluminum cans without lids comprising the steps of:

using a depalletizer to unload palletized aluminum cans into an apparatus which reduces the volume of the palletized aluminum cans; and transporting the cans thus reduced in volume to recycling, wherein the step of using a depalletizer to unload palletized aluminum cans into an apparatus which reduces the volume of the palletized aluminum cans, comprises:

freely feeding an entire layer of aluminum cans without lids supported on a sheet of a pallet loaded with aluminum cans without lids, wherein the layer of aluminum cans without lids has a rectangular array having a length and a width;

ejecting the entire layer of aluminum cans without lids through a depalletizer opening which passes an entire row of cans without lids defining the width of the layer of aluminum cans without lids, thereby feeding simultaneously all the cans without lids in the row directly from the depalletizer opening onto a chute having an inclined bottom wall and side walls which extend upwardly from the inclined bottom wall, wherein the side walls converge toward each other as the chute extends away from the depalletizer opening;

conveying said ejected entire row of cans without lids fed into the chute to disorder the cans without lids such that the cans without lids tip off a can vertical axis and proceed along the chute to a hopper, and feeding said entire row of cans without lids from the chute to a baler receiving the cans without lids from the hopper; and crushing the cans received within the baler to form a bale; and wherein the cans without lids of each layer are advanced into the baler through the chute having the side walls converging toward each other as the chute extends away from the depalletizer opening so the flow of cans without lids is disordered as it empties into the hopper.

2. The method of claim 1 wherein the apparatus which reduces the volume of the palletized aluminum cans is a device which crushes the cans into a bale.

3. The method of claim 1 wherein the depalletizer is operated open loop.

4. The method of claim 1 wherein the hopper is comprised of elements with gaps therebetween providing visibility into the hopper for observation of the cans being received therein.

5. The method of claim 1 wherein the hopper projects upwardly from the baler, and wherein the chute discharges into the hopper, and wherein the hopper is comprised of elements with gaps therebetween providing visibility into the hopper for observation of the cans being received therein.

6. A method of disposing of palletized aluminum cans without lids for recycling, the method comprising the steps of:

introducing into a depalletizer having a frame a pallet having multiple layers of aluminum cans without lids, each layer being supported on a sheet;

actuating a pusher within the depalletizer to feed each layer of aluminum cans without lids through a discharge opening in the frame directly onto a downwardly extending chute, the chute having upwardly extending side walls, thus causing an entire row of cans without lids to be fed into the chute thereby disordering the cans without lids to be tipped off a can vertical axis, and to advance by the force of gravity along the chute into a baler;

wherein the cans without lids of each layer are advanced into the baler through the chute having the upwardly extending side walls converging toward each other as the chute extends away from the discharge opening so the flow of cans without lids is disordered as it empties into the baler;

compressing the cans received within the baler into a dense bale of crushed aluminum; and transporting said dense bale of crushed aluminum to a remote location for recycling.

7. The method of claim 6 wherein the depalletizer is operated to feed the layer of aluminum cans in a continuous and even rate to the chute.

8. The method of claim 6 wherein the depalletizer does not receive any feedback with respect to a position of the cans as they pass to the chute.

9. The method of claim 6 wherein the depalletizer is operated with an open loop drive to push the layer of cans into the chute at a constant velocity.

10. The method of claim 6 wherein the depalletizer is operated open loop without feedback to completely remove all the cans on the pallet.

* * * * *